United States Patent
Kim et al.

(10) Patent No.: US 11,514,762 B2
(45) Date of Patent: Nov. 29, 2022

(54) AUTOMATED TELLER MACHINE

(71) Applicant: HYOSUNG TNS INC., Seoul (KR)

(72) Inventors: Seok Won Kim, Gyeonggi-do (KR);
Kyoung Soo Kim, Gyeonggi-do (KR);
Seung Soo Lee, Gyeonggi-do (KR)

(73) Assignee: HYOSUNG TNS INC., Seoul (KR)

( * ) Notice: Subject to any disclaimer, the term of this patent is extended or adjusted under 35 U.S.C. 154(b) by 308 days.

(21) Appl. No.: 16/893,466

(22) Filed: Jun. 5, 2020

(65) Prior Publication Data
US 2021/0383655 A1 Dec. 9, 2021

(51) Int. Cl.
*G07F 19/00* (2006.01)
*G05B 15/02* (2006.01)

(52) U.S. Cl.
CPC ........... *G07F 19/203* (2013.01); *G05B 15/02* (2013.01); *G07F 19/202* (2013.01)

(58) Field of Classification Search
None
See application file for complete search history.

(56) References Cited

U.S. PATENT DOCUMENTS

| | | | | |
|---|---|---|---|---|
| 4,989,520 A * | 2/1991 | Hain | ................ | G07D 11/0096 109/66 |
| 6,241,150 B1 * | 6/2001 | Patterson | ................ | G07D 11/40 902/12 |
| 10,472,157 B1 * | 11/2019 | Dudding | ................ | B32B 1/02 |
| 10,621,833 B1 * | 4/2020 | Dadhaniya | ................ | G07F 19/203 |
| 10,796,537 B1 * | 10/2020 | Farivar | ................ | G07F 19/207 |
| 11,349,380 B2 * | 5/2022 | Zang | ................ | H02K 33/18 |
| 2003/0193273 A1 * | 10/2003 | Yamashita | ................ | G07F 19/205 312/100 |
| 2004/0086309 A1 * | 5/2004 | Ohara | ................ | G03G 15/0233 399/353 |
| 2006/0202026 A1 * | 9/2006 | Kim | ................ | G07F 19/20 902/8 |
| 2013/0015035 A1 * | 1/2013 | Tanaka | ................ | G07D 11/14 194/206 |
| 2019/0108731 A1 * | 4/2019 | Hazard | ................ | G07F 19/206 |
| 2021/0024308 A1 * | 1/2021 | Togano | ................ | B65H 1/04 |
| 2022/0122855 A1 * | 4/2022 | Kuwano | ................ | H01L 21/31 |
| 2022/0161185 A1 * | 5/2022 | Yoshimura | ................ | B01D 71/52 |

OTHER PUBLICATIONS

"James Miller, ATM Business Basics Part I: How ATMs work, ATMDepot.com, 2019" (Year: 2019).*

* cited by examiner

*Primary Examiner* — Kito R Robinson
*Assistant Examiner* — Toan Duc Bui
(74) *Attorney, Agent, or Firm* — Bacon & Thomas, PLLC

(57) ABSTRACT

An automated teller machine includes a main body; a customer service unit; a deposit/withdrawal unit to separate and stack medium; a tray unit for transferring the medium while reciprocating between the deposit/withdrawal unit and the customer service unit; and a throat unit providing a transfer path of the tray unit. The tray unit includes: a tray bottom plate forming a bottom surface of the tray unit, and a tray rib protruded from a lower surface of the tray bottom plate. The throat unit includes a throat bottom plate forming a bottom surface of the throat unit, and a support member protruded from the throat bottom plate. The tray rib and the support member are arranged without interfering with each other, and overlapped with each other in at least parts of the tray rib and the support member when viewed from a side of the ATM.

9 Claims, 6 Drawing Sheets

FIG.6

AUTOMATED TELLER MACHINE

FIELD OF THE INVENTION

The present disclosure relates to an automated teller machine.

BACKGROUND OF THE INVENTION

Generally, an automated teller machine ATM provides financial services such as deposit and withdrawal of cash and check using a card or a passbook without a bank employee regardless of time and place.

The ATM may be classified into a withdrawal machine, a deposit machine, and a deposit and withdrawal machine depending on whether a transaction is a deposit or a withdrawal. The ATM is variously used for cash deposit/withdrawal, check deposit/withdrawal, passbook update, electronic bill payment, ticket sales, and the like.

A conventional ATM can be classified into two types depending on an insertion type of a medium such as cash or check. One is a pocket type in which a deposit/withdrawal unit has a pocket shape and allows a user to insert a medium into a pocket. The other one is a present type in which a bill is inserted or withdrawn through a slot formed at the deposit/withdrawal unit.

In the case of the pocket type, a user needs to insert a hand into the pocket to insert a medium for deposit. However, depending on a user's culture, a user often minds putting a part of a body into a machine. Therefore, the present type in which a user can deposit/withdraw a medium without inserting a hand into the deposit/withdrawal unit can be applied as a solution to the problem of the pocket type. However, the present type is disadvantageous in that it is weak in security and the number of medium that can be deposited/withdrawn at one time is limited. Thus, a user who wants to deposit/withdraw a large amount of medium at one time feels uncomfortable.

Although there have been attempts to combine the pocket type and the present type to solve the problems of the two types (see, e.g., Korean Patent Application Publication No. 10-2014-0077439), it is still far from practical application due to a complicated structure and lack of practicality. One of the alternatives may be a manner in which a tray unit transfers the medium while reciprocating between a customer service unit and a deposit/withdrawal unit. Therefore, there is a demand for research on a deposit/withdrawal unit having an innovative structure capable of solving the problems of the pocket type and the present type.

SUMMARY OF THE INVENTION

In view of the above, the present disclosure provides an automated teller machine (ATM) capable of easily detecting and handling a medium dropped on a transfer path of the tray unit while solving the problems of the pocket type and the present type.

In accordance with a first aspect of the present disclosure, there is provided an automated teller machine (ATM) including: a main body; a customer service unit provided at a front side of the main body; a deposit/withdrawal unit disposed in the main body to separate and stack medium; a tray unit for transferring the medium while reciprocating between the deposit/withdrawal unit and the customer service unit; and a throat unit providing a transfer path of the tray unit, wherein the tray unit includes: a tray bottom plate forming a bottom surface of the tray unit; and a tray rib protruded from a lower surface of the tray bottom plate, wherein the throat unit includes: a throat bottom plate forming a bottom surface of the throat unit; and a support member protruded from the throat bottom plate, and wherein the tray rib and the support member are arranged without interfering with each other, and overlapped with each other in at least parts of the tray rib and the support member when viewed from a side of the ATM.

The throat unit may further include: a medium detection sensor embedded in the throat bottom plate or the support member to expose an upper surface of the medium detection sensor, the medium detection sensor detecting the medium dropped down on the throat unit from the tray unit.

The automated teller machine may further include: a controller configured to control the tray unit and receive a detection signal from the medium detection sensor, wherein the controller is configured to control the tray unit so that the tray unit moves toward the customer service unit when a drop of the medium is detected by the medium detection sensor.

The tray unit may further include: a brush formed on the lower surface of the tray bottom plate, an end of the brush being positioned to be contact with the upper surface of the medium detection sensor, wherein the upper surface of the medium detection sensor is cleaned by sweeping the upper surface of the medium detection sensor with the end of the brush as the tray unit reciprocates between the customer service unit and the deposit/withdrawal unit.

In accordance with a second aspect of the present disclosure, there is provided an automated teller machine (ATM) including: a main body; a customer service unit provided at a front side of the main body; a deposit/withdrawal unit disposed in the main body to separate and stack medium; a tray unit for transferring the medium while reciprocating between the deposit/withdrawal unit and the customer service unit; and a throat unit providing a transfer path of the tray unit, wherein the tray unit includes: a tray bottom plate forming a bottom surface of the tray unit; and a tray rib protruded from a lower surface of the tray bottom plate, wherein the throat unit comprises: a throat bottom plate forming a bottom surface of the throat unit; and a bottom plate rib protruded toward the tray bottom plate from the throat bottom plate, and wherein the tray rib and the bottom plate rib are arranged without interfering with each other, and overlapped with each other in at least parts of the tray rib and the bottom plate rib when viewed from a side of the ATM.

The deposit/withdrawal unit may include: a bill stopper rotatably provided to open and close an entrance of the deposit/withdrawal unit through which the tray unit enters and exits, wherein the bottom plate rib extends toward the deposit/withdrawal unit from the customer service unit such that the bottom plate rib is extended to a line which vertically extends from a free end of the bill stopper in a state that the free end of the bill stopper is rotated to an uppermost position.

The bottom plate rib may be formed by bending a portion of the throat bottom plate upward.

The throat unit may further include: a medium detection sensor embedded in the throat bottom plate or the support member to expose an upper surface thereof, the medium detection sensor detecting a medium dropped down on the throat bottom plate from the tray unit.

The throat unit may include: a support member protruded from the throat bottom plate without interfering with the bottom plate rib and the tray rib, wherein an upper end of the support member is flush with an upper end of the bottom plate rib.

The throat unit may include: a support member protruded from the throat bottom plate without interfering with the bottom plate rib and the tray rib, wherein the support member and the bottom plate rib are formed to have different heights from each other.

Effect of the Invention

In accordance with the embodiment of the present disclosure, the problems of the pocket type and the present type can be solved and, when a medium is dropped on a transfer path of the tray unit, it can be easily detected and handled.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Hereinafter, configurations and operations of embodiments will be described in detail with reference to the accompanying drawings. The following description is one of various patentable aspects of the disclosure and may form a part of the detailed description of the disclosure.

In describing the embodiments of the present disclosure, the detailed descriptions of well-known functions or configurations will be omitted if it is determined that the detailed descriptions of well-known functions or configurations may unnecessarily make obscure the spirit of the present disclosure.

The disclosure may be variously modified and may include various embodiments. Specific embodiments will be exemplarily illustrated in the drawings and described in the detailed description of the embodiments. However, it should be understood that they are not intended to limit the disclosure to specific embodiments but rather to cover all modifications, similarities, and alternatives which are included in the spirit and scope of the disclosure.

The terms used herein, including ordinal numbers such as "first" and "second" may be used to describe, and not to limit, various components. The terms simply distinguish the components from one another.

When it is said that a component is "coupled" or "linked" to another component, it should be understood that the former component may be directly connected or linked to the latter component or a third component may be interposed between the two components.

Specific terms used in the present application are used simply to describe specific embodiments without limiting the disclosure. An expression used in the singular encompasses the expression of the plural, unless it has a clearly different meaning in the context.

Hereinafter, an embodiment of the present disclosure will be described in detail with reference to the accompanying drawings.

Referring to FIGS. 1 to 4, the automated teller machine (ATM) 1 according to an embodiment of the present disclosure may include a main body 10, a deposit/withdrawal unit 20, a tray unit 30, a customer service unit 40, a throat unit 50, and a controller 60.

Specifically, the main body 10 forms an outer shape of the ATM 1, and the customer service unit 40 may be provided provided at a front side of the main body 10. The customer service unit 40 may be understood as assembly of a customer service space provided for the deposit or withdrawal of a medium M, such as bills or checks, and peripheral members constructing the customer service space.

The deposit/withdrawal unit 20, the tray unit 30, the customer service unit 40, the throat unit 50, and the controller 60 may be provided in the main body 10.

The deposit/withdrawal unit 20 may be provided in the main body 10 to separate and stack medium M to be deposited/withdrawn. The deposit/withdrawal unit 20 may include a bill stopper 200, a housing 210, a separation/stacking module 220, and a lifting module 230.

For example, the bill stopper 200 is rotatably provided at the housing 210 of the deposit/withdrawal unit 20, and can open and close an entrance of the deposit/withdrawal unit 20 through which the tray unit 30 is inserted into or taken out from the housing 210, if necessary. In other words, the bill stopper 200 may be operated to open the entrance when the tray unit 30 is taken out from the deposit/withdrawal unit 20, and close the entrance when the tray unit 30 is inserted into the deposit/withdrawal unit 20.

The housing 210 may be provided inside the main body 10, and the separation/stacking module 220 may be disposed in the housing 210. The separation/stacking module 220 may include a separating roller 222 and a stacking roller 224. The separating roller 222 may separate the medium M transferred by the tray unit 30, and the stacking roller 224 may stack a rejected medium M or a medium M to be withdrawn among the medium M separated by the separating roller 22 in the tray unit 30.

In addition, the lifting module 230 may be provided in the housing 210 and selectively move the tray unit 30 in a vertical direction. Due to the vertical movement of the lifting module 230, the medium M stacked in the tray unit 30 can be transferred along the transfer path in the main body 10, or the medium M in the main body 10 can be transferred to a position where the medium M can be stacked in the tray unit 30.

The tray unit 30 may transfer the medium M into the main body 10 while reciprocating between the deposit/withdrawal unit 20 and the customer service unit 40. The tray unit 30 may receive a medium M from a customer at the customer service unit 40 and move to the deposit/withdrawal unit 20 to separate and store the medium M. Further, the tray unit 30 may receive a withdrawal target medium M from the deposit/withdrawal unit 20 and move to the customer service unit 40 to deliver the medium M to a customer.

To this end, the tray unit 30 may include a tray body 300, a tray bottom plate 310, a clamping plate 320, a tray rib 330, and a brush 340.

The tray body 300 may be provided to reciprocate in a horizontal direction along the transfer path arranged between the deposit/withdrawal unit 20 and the customer service unit 40. The tray bottom plate 310 may form a bottom surface of the tray unit 30, and be fixed to the lifting module 230 when the tray body 300 is inserted into the housing 210. In addition, a space in which the medium M is stacked may be formed on the tray bottom plate 310.

The clamping plate 320 may be connected to the tray body 300 to be slidable in the vertical direction, and press and fix the medium M stacked on the tray bottom plate 310 so that it cannot move against the tray body 300. To this end, the tray unit 30 may further include a driving member (not shown in the drawings) for vertically moving the clamping plate 320. Further, the clamping plate 320 may be configured to press the medium M by its own weight. However, this is nothing but an example, and the spirit of the present disclosure is not limited thereto. For example, the clamping plate 320 may be suppressed downward by the above-described driving member or another separate member to press the medium M.

The tray rib 330 may have protrusions protruded from a lower surface of the tray bottom plate 310, and may be provided in one or plural. When a plurality of tray ribs 330 are provided, they may be arranged to be spaced apart from each other in a predetermined distance with respect to the lower surface of the tray bottom plate 310 or to be spaced apart from each other in an irregular pattern. Thus, the medium M dropped down on a throat bottom plate 500 of the throat unit 50, which will be described later, may be discharged toward the customer service unit 40 by the movement of the tray unit 30 and can be easily removed. Specifically, as the tray unit 30 moves toward the customer service unit 40, while interfering with the medium M dropped down by the tray rib 330, the medium M may be moved together toward the customer service unit 40 and removed therefrom.

Similar to the tray rib 330, the brush 340 may be formed on the lower surface of the tray bottom plate 310, and an end of the brush 340 may be in contact with an upper surface of a medium detection sensor 520 of the throat unit 50, which will be described later. For example, the brush 340 may be provided as a bundle of fine fibres protruded from the lower surface of the tray bottom plate 310. Further, whenever the tray unit 30 reciprocates, the brush 340 may remove foreign substances such as dust accumulated on the upper surface of the medium detection sensor 520 as the end of the brush 340 sweeps the upper surface of the medium detection sensor 520.

The customer service unit 40 may be provided at the front side of the main body 10 to facilitate the deposit or withdrawal by the customer. In the customer service unit 40, the medium M may be inserted into or discharged from the interior of the automated teller machine 1 through a customer reception opening. The customer service unit 40 may include a customer reception shutter 410 controlled by a control signal of the controller 60 to open and close the customer reception opening.

The throat unit 50 may include a path through which the tray unit 30 can reciprocate between the customer service unit 40 and the deposit/withdrawal unit 20, and may be provided as part of a frame constituting the main body 10. For example, the throat unit 50 may be formed in the main body 10, and may be provided as a frame constituting a passage through which the tray unit 30 moves. The throat unit 50 may be made of a metal, such as, iron or aluminum, and may be manufactured, in some embodiments, by a sheet metal process. However, this is nothing but an example, and the manufacture of the throat unit 50 is not limited thereto.

In addition, the throat unit 50 may include the throat bottom plate 500, a support member 510, the medium detection sensor 520, and a bottom plate rib 530.

The throat bottom plate 500 may be a plate-shaped member forming a bottom surface of the throat unit 50 and may be arranged under the tray unit 30. For example, the tray unit 30 may not be supported directly by the throat bottom plate 500. The throat bottom plate 500 may be arranged to be spaced apart at a predetermined distance from the lower surface of the tray unit 30.

The support member 510 may be protruded from the throat bottom plate 500, and one or more of the support members 510 may be arranged to be spaced apart from each other. Further, the support member 510 may have a space in which the medium detection sensor 520 is embedded and supported therein. The space of the support member 510 may be opened upwardly.

The medium detection sensor 520 may be embedded in the support member 510 so that a top surface of the medium detection sensor 520 is exposed. In this embodiment, it is described as an example that the medium detection sensor 520 may be embedded in the support member 510, but is not limited thereto. Alternatively, the medium detection sensor 520 may be installed in the throat bottom plate 500 with the top surface thereof exposed. For example, the medium detection sensor 520 may be a light detection sensor including therein a light-emitting unit and a light-receiving unit. The light emitted from the light-emitting unit may be reflected from the medium M falling on an upper side of the medium detection sensor 520 and then entered in the light-receiving unit so that the medium detection sensor 520 detects the incident light to generate a detection signal. The detection signal generated in this way may be transmitted to the control unit 60, which will be described later. Besides, only one medium detection sensor 520 may be provided to the support member 510, and alternatively, the medium detection sensor 520 may be provided in plural and arranged to be spaced apart from each other in a longitudinal direction. When provided in plural, for example, they may be arranged spaced apart at regular intervals.

The bottom plate rib 530 may be a rib protruded from the throat bottom plate 500. For example, the bottom plate rib 530 may be formed by bending a portion of base material upward when the throat bottom plate 500 is made of sheet metal. However, this is nothing but an example, and the bottom plate rib 530 may be separately manufactured and installed on the throat bottom plate 500 using welding or adhesion. One or more bottom plate ribs 530 may be formed, and for example, a plurality of bottom plate ribs 530 may be provided and arranged to be symmetrical left and right around a central point of the throat bottom plate 500. In addition, the bottom plate rib 530, the support member 510 and the tray rib 330 may be arranged so as not to interfere with each other, and when viewed from the side, at least a portion thereof may be provided to overlap one another. Thus, the medium dropped down from the tray unit 30 may be placed on upper sides of the bottom plate rib 530 and the support member 510, and may be spaced apart from an upper surface of the throat bottom plate 500. As described above, the dropped medium may be interfered with the tray rib 330 at least partially overlapping the bottom plate rib 530 and the support member 510 when viewed from the side, and discharged through the customer service unit 40.

Further, the bottom plate rib 530 may extend toward the deposit/withdrawal unit 20 from the customer service unit 40. At this time, the bottom plate rib 530 may extend to a point where the bottom plate rib 530 does not overlap with the bill stopper 200 in the vertical direction in a state that the housing 210 of the deposit/withdrawal unit 20 is fully opened by the bill stopper 200, that is, the bill stopper 200 is rotated to the uppermost position. In other words, the bottom plate rib 530 extends toward the deposit/withdrawal unit 20 from the customer service unit 40 such that the bottom plate rib 530 is extended to a line which vertically extends from a free end of the bill stopper 200 in a state that the free end of the bill stopper 200 is rotated to the uppermost position. This makes it possible for the bottom plate rib 530 to cover an entire area of the throat bottom plate 500 on which the medium M can be fallen while the bill stopper 200 does not interfere with the bottom plate rib 530.

Besides, the bottom plate rib 530 may have a height less than that of the support member 510. However, this is nothing but an example, and the bottom plate rib 530 and the support member 510 may be formed at the same height, or the support member 510 may be formed lower than the bottom plate rib 530.

Figure 1:
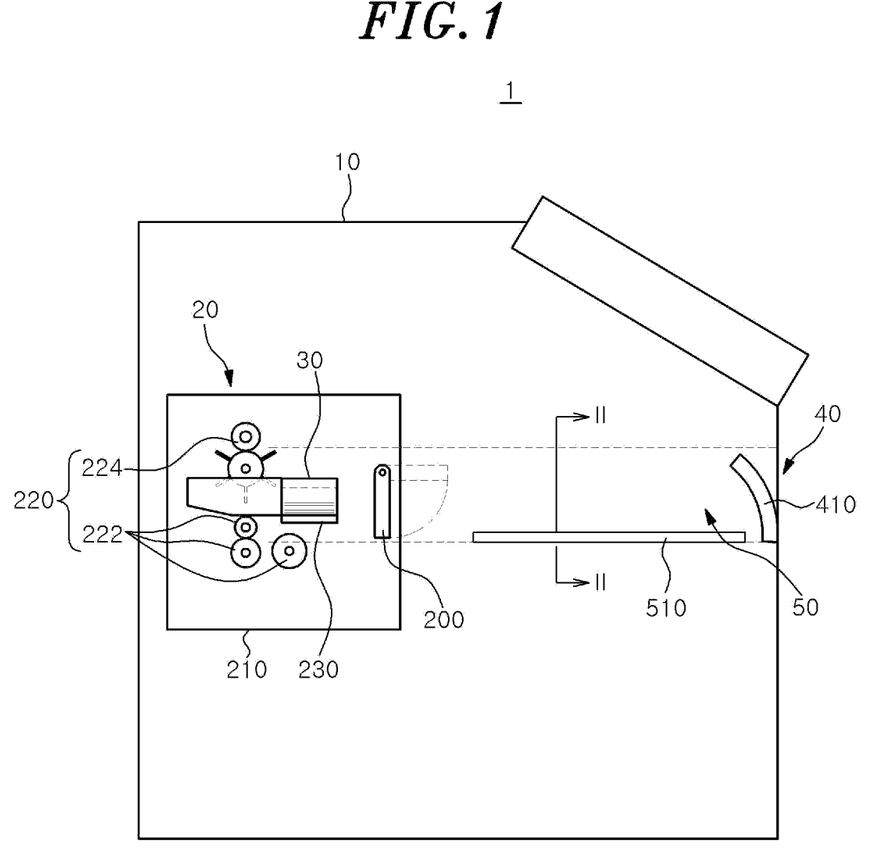
FIG. 1 is a conceptual diagram of an automated teller machine ATM according to an embodiment of the present disclosure.
Figure 2:
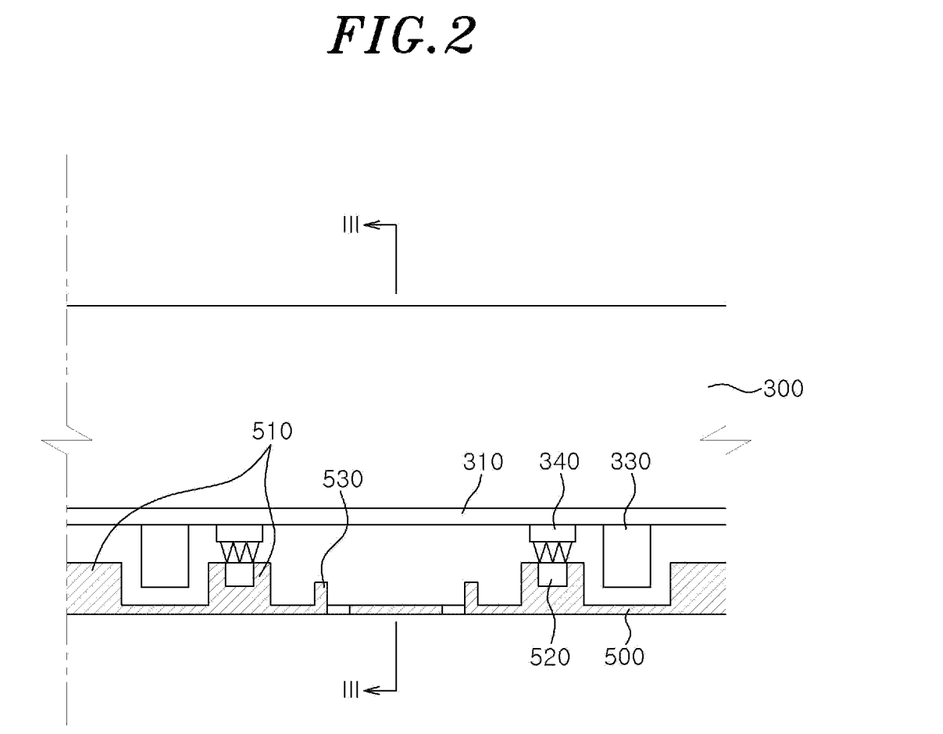
FIG. 2 is a cross-section view taken along a line II-II in FIG. 1.
Figure 3:
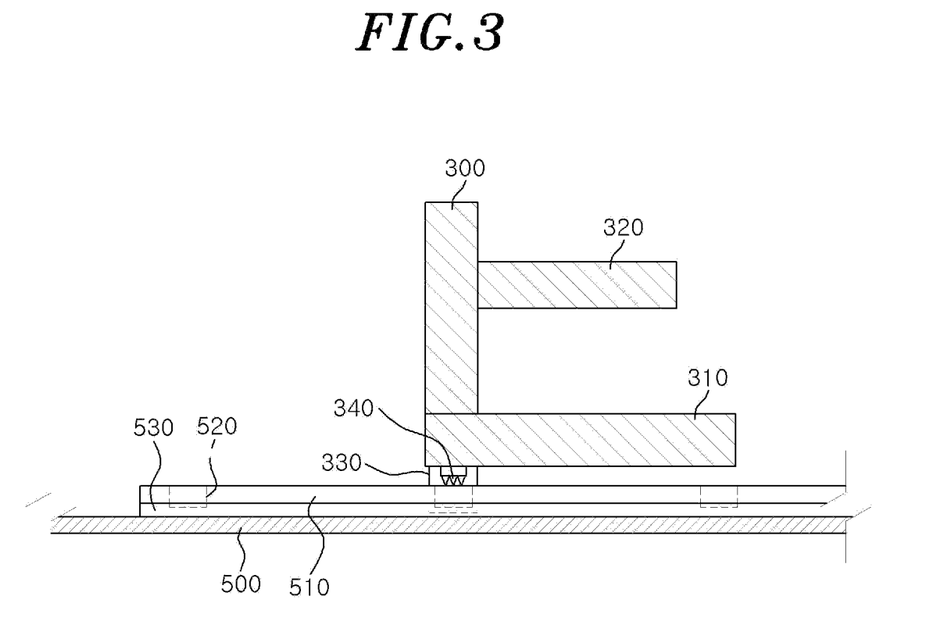
FIG. 3 is a side view of a tray unit and a throat unit taken along a line III-III in FIG. 2.
Figure 4:
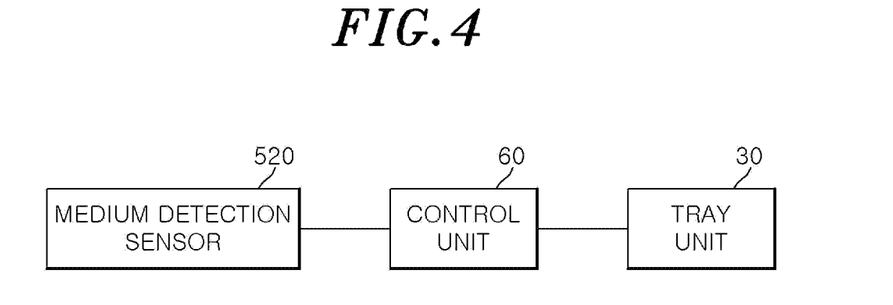
FIG. 4 is a control block diagram of the automated teller machine in FIG. 1.

The controller 60 may be connected to the tray unit 30 to drive the tray unit 30 to control the reciprocating movement between the customer service unit 40 and the deposit/withdrawal unit 20. Further, the controller 60 may be connected to the medium detection sensor 520 to receive the detection signal generated by the medium detection sensor 520 to identify whether the medium is dropped, and drive the tray unit 30 again to discharge the dropped medium through the customer service unit 40.

At this time, the tray unit 30 may be detected by the medium detection sensor 520 as the tray unit 30 passes over the medium detection sensor 520 or the tray unit 30 stopped at the upper side of the medium detection sensor 520, or the like. To this end, the controller 60 may have functions of driving the tray unit 30 and simultaneously grasping the position of the tray unit 30. For example, when the tray unit 30 is driven by the operation of a step motor, the controller 60 may count the number of steps of the step motor to identify the position of the tray unit 30, and an additional sensor for detecting the position of the separate tray unit 30 may be provided. Further, when the tray unit 30 is determined to be positioned on the upper side of the medium detection sensor 520 by identifying the position of the tray unit 30, the controller 60 may be configured to ignore the detection signal generated from the corresponding medium detection sensor 520.

The controller 60 may be formed of, for example, a small embedded computer, and may include a data processing unit with software program, memory, and CPU. Such program may include an algorithm for performing the functions of receiving a detection signal to the dropped medium from the medium detection sensor 520, identifying whether the medium is dropped, and then driving the tray unit 30 to discharge the dropped medium. Further, the program may be stored in a memory such as a computer storage medium such as a flexible disk, a compact disk, a hard disk, or a magneto-optical MO disk, and installed in the controller 60.

Hereinafter, it will be described the operation and effect of the automated teller machine having the above-described configuration with reference to FIGS. 5 and 6.

Figure 5:
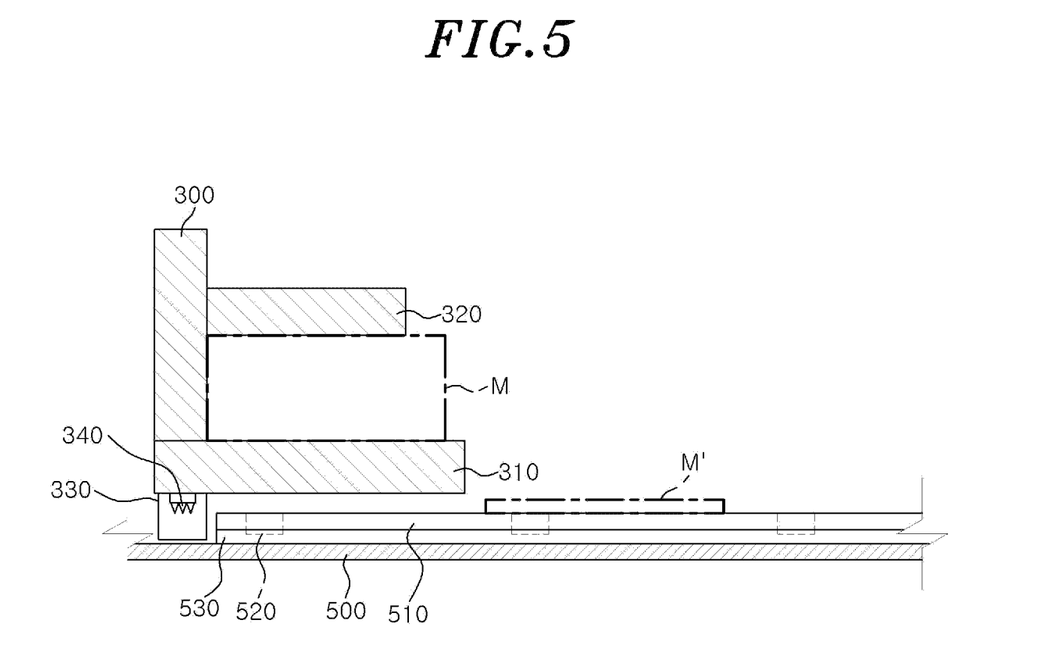
FIG. 5 is a view showing a medium dropped down on a bottom plate of the throat unit of the automated teller machine in FIG. 1.
Figure 6:
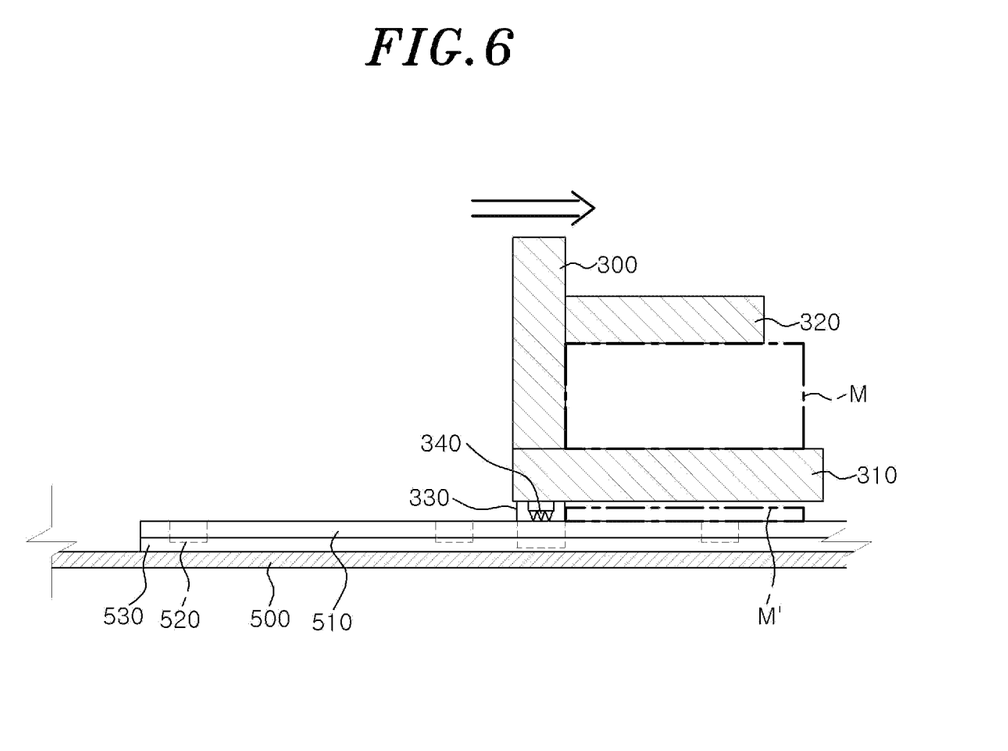
FIG. 6 shows that the medium dropped down on the bottom plate of the throat unit is being removed by the tray unit from the bottom plate thereof.

Referring to FIGS. 5 and 6, in order for the customer to input the medium M through the customer service unit 40, the controller 60 may control the tray unit 30 to move to the customer service unit 40. At this time, when the customer reception shutter 410 is opened, the tray body 300 may be exposed to the outside through the customer service unit 40. Then, the tray unit 30 may wait for the input of the medium M in the customer service unit 40, and the customer may place the medium M in the tray unit 30. Then, the tray unit 30 moves to the rear of the customer service unit 40, and the customer reception shutter 410 is closed.

When the customer reception shutter 410 is closed, the controller 60 may retract the tray unit 30 to the deposit/withdrawal unit 20, and when the tray unit 30 is moved, the clamping plate 320 may be descended to clamp the medium M so that the medium M is transferred with clamped. To this end, the clamping plate 320 may be descended by a driving member (not shown). Further, the medium M may be pressed and clamped between the clamping plate 320 and the tray bottom plate 310 by the weight of the clamping plate 320. When the tray unit 30 is seated and accommodated in the deposit/withdrawal unit 20, the medium M may be separated into sheets by the separating roller 222 and transferred to and stored in a cassette (not shown) in the main body 10.

Meanwhile, even when the medium M is clamped by the clamping plate 320, the medium M may be dropped down on the throat bottom plate 500 for various reasons, such as not properly clamping the medium M due to conditions of the medium M e.g., degree of wrinkles, degree of damage, etc., or accidentally putting by the customer the medium M under the tray unit 30. The medium M' thus dropped may be seated on the support member 510 or the bottom plate rib 530. The dropped medium M' may be detected by the medium detection sensor 520, and the medium detection sensor 520 may detect the dropped medium M' and then generate the detection signal and transmit it to the controller 60.

When receiving the detection signal to the dropped medium M', the controller 60 may move again the tray unit 30 retracted toward the deposit/withdrawal unit 20 to the customer service unit 40, and in this process, the medium M' may be interfered by the tray rib 330 protruded from the tray bottom plate 310 and may be moved together with the tray unit 30, and the moved medium M' may be discharged through the customer service unit 40. At this time, as the tray unit 30 approaches the customer service unit 40, the customer reception shutter 410 is opened, so that the dropped medium M' may pass through the customer service unit 40 and be transferred back to the customer.

According to the embodiments of the present disclosure as described above, when the medium are dropped down on the transfer path of the tray unit, it can be detected and easily processed.

Although the embodiments of the present disclosure have been described above with reference to the accompanying drawings, those skilled in the art to which the present disclosure pertains will appreciate that the present disclosure may be implemented in other specific forms without changing the technical spirit or essential features of the present disclosure. For example, those skilled in the art may change the material, size, and the like of each component according to the application field, or combine or replace the embodiments to perform in a form not explicitly disclosed in the embodiments of the present disclosure without departing from the scope of the present disclosure. Therefore, the embodiments described above are illustrative in all aspects and should not be understood as limiting. It should be understood that such modified embodiments are included in the technical spirit described in the claims of the present disclosure.

What is claimed is:

1. An automated teller machine (ATM) comprising:
a main body;
a customer service unit provided at a front side of the main body;
a deposit/withdrawal unit disposed in the main body to separate and stack medium;
a tray unit for transferring the medium while reciprocating between the deposit/withdrawal unit and the customer service unit;
a throat unit providing a transfer path of the tray unit; and
a controller configured to control the tray unit,
wherein the tray unit comprises:
a tray bottom plate forming a bottom surface of the tray unit; and
a tray rib protruded from a lower surface of the tray bottom plate,
wherein the throat unit comprises:
a throat bottom plate forming a bottom surface of the throat unit;
a support member protruded from the throat bottom plate; and
a medium detection sensor configured to detect a dropped medium that has dropped from the tray unit onto the throat unit,
wherein the tray rib and the support member are arranged without interfering with each other, and overlapped with each other in at least parts of the tray rib and the support member when viewed from a side of the ATM,
wherein the controller is configured to receive a detection signal from the medium detection sensor, and
wherein, when the dropped medium is detected by the medium detection sensor, the controller controls the tray unit to move toward the customer service unit while the tray rib interferes with the dropped medium so that the dropped medium is moved by the tray rib towards the customer service unit.

2. The automated teller machine of claim 1, wherein the medium detection sensor is embedded in the throat bottom plate or the support member to expose an upper surface of the medium detection sensor.

3. The automated teller machine of claim 2, wherein the tray unit further comprises:
a brush formed on the lower surface of the tray bottom plate, an end of the brush being positioned to be contact with the upper surface of the medium detection sensor,
wherein the upper surface of the medium detection sensor is cleaned by sweeping the upper surface of the medium detection sensor with the end of the brush as the tray unit reciprocates between the customer service unit and the deposit/withdrawal unit.

4. An automated teller machine (ATM) comprising:
a main body;
a customer service unit provided at a front side of the main body;
a deposit/withdrawal unit disposed in the main body to separate and stack medium;
a tray unit for transferring the medium while reciprocating between the deposit/withdrawal unit and the customer service unit;
a throat unit providing a transfer path of the tray unit; and
a controller configured to control the tray unit,
wherein the tray unit comprises:
a tray bottom plate forming a bottom surface of the tray unit; and
a tray rib protruded from a lower surface of the tray bottom plate,
wherein the throat unit comprises:
a throat bottom plate forming a bottom surface of the throat unit;
a bottom plate rib protruded toward the tray bottom plate from the throat bottom plate; and
a medium detection sensor configured to detect a dropped medium that has dropped from the tray unit onto the throat bottom plate,
wherein the tray rib and the bottom plate rib are arranged without interfering with each other, and overlapped with each other in at least parts of the tray rib and the bottom plate rib when viewed from a side of the ATM, and
wherein the controller is configured to receive a detection signal from the medium detection sensor, and
wherein, when the dropped medium is detected by the medium detection sensor, the controller controls the tray unit to move toward the customer service unit while the tray rib interferes with the dropped medium so that the dropped medium is moved by the tray rib towards the customer service unit.

5. The automated teller machine of claim 4, wherein the deposit/withdrawal unit comprises:
a bill stopper rotatably provided to open and close an entrance of the deposit/withdrawal unit through which the tray unit enters and exits,
wherein the bottom plate rib extends toward the deposit/withdrawal unit from the customer service unit such that the bottom plate rib is extended to a line which vertically extends from a free end of the bill stopper in a state that the free end of the bill stopper is rotated to an uppermost position.

6. The automated teller machine of claim 4, wherein the bottom plate rib is formed by bending a portion of the throat bottom plate upward.

7. The automated teller machine of claim 4, wherein the medium detection sensor is embedded in the throat bottom plate or the support member to expose an upper surface thereof.

8. The automated teller machine of claim 4, wherein the throat unit comprises:
a support member protruded from the throat bottom plate without interfering with the bottom plate rib and the tray rib,
wherein an upper end of the support member is flush with an upper end of the bottom plate rib.

9. The automated teller machine of claim 4, wherein the throat unit comprises:
a support member protruded from the throat bottom plate without interfering with the bottom plate rib and the tray rib,
wherein the support member and the bottom plate rib are formed to have different heights from each other.

* * * * *